United States Patent [19]

Vezzani

[11] Patent Number: 5,554,409
[45] Date of Patent: Sep. 10, 1996

[54] METHOD OF PRODUCING CHOCOLATE CONTINUOUSLY ON AN INDUSTRIAL SCALE

[75] Inventor: Corrado Vezzani, Milan, Italy

[73] Assignee: Vomm Impianti E Processi S.r.L., Milan, Italy

[21] Appl. No.: 343,244

[22] Filed: Nov. 22, 1994

[51] Int. Cl.⁶ .............................. A23G 1/10; A23G 1/16; A23G 1/04; B01F 7/16
[52] U.S. Cl. .............................. 426/631; 99/348; 99/470; 99/472; 99/477; 99/483
[58] Field of Search .............................. 426/631; 99/470, 99/472, 477, 483, 348

[56] References Cited

U.S. PATENT DOCUMENTS

| | | | |
|---|---|---|---|
| 4,628,803 | 12/1986 | Bonora et al. | 99/348 |
| 5,100,510 | 3/1992 | Bianchi et al. | 159/6.3 |
| 5,430,077 | 7/1995 | Unger | 523/351 |

OTHER PUBLICATIONS

Cook Chocolate Production and Use, 1963 Magazines for Industry, Inc. pp. 140–159.

*Primary Examiner*—Esther M. Kepplinger
*Assistant Examiner*—Choon P. Koh
*Attorney, Agent, or Firm*—Rosen, Dainow & Jacobs Limited Liability Partnership

[57] ABSTRACT

A conching step for the production of chocolate is described and is carried out by means of a turbomixer which arranges the previously refined chocolate paste in a thin, dynamic layer which flows in contact and in a heat-exchange relationship with an internal wall of the turbomixer.

5 Claims, 1 Drawing Sheet

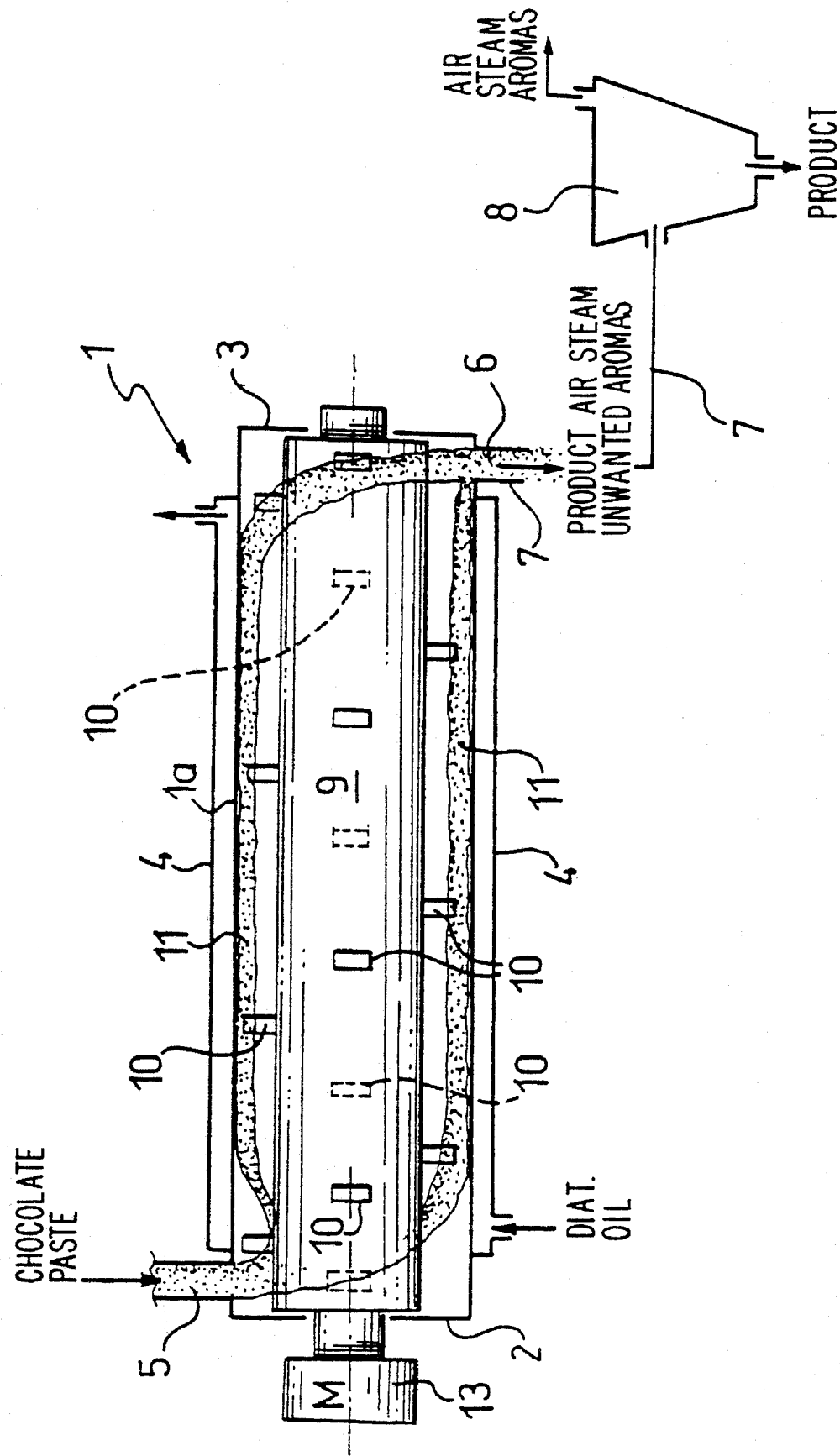

METHOD OF PRODUCING CHOCOLATE CONTINUOUSLY ON AN INDUSTRIAL SCALE

BACKGROUND OF THE INVENTION

In general, the present invention relates to a method of producing chocolate on an industrial scale.

As is known, conventionally, the production of chocolate is based on the performance of a whole series of steps of which the basic steps comprise:

cleaning: to clean the raw cocoa beans, torrefaction, by which the beans are roasted, winnowing and de-germing: to remove shells and germ, solubilizing by treatment with hot alkalis, grinding and mixing of various types of cocoa and possibly other components such as, for example, sugars, various flavourings, milk and the like, refining: by roller machines to produce a refined chocolate paste which is then subjected to CONCHING, possibly with the addition of cocoa butter and lecithin, to remove moisture, air and volatile substances which are unpleasant from an organoleptic point of view, all to develop the qualitative characteristics of chocolate and, finally, controlled cooling and forming or moulding.

It is also known that, of all the steps listed above, conching is of fundamental importance and is actually critical for the purposes of the final quality of the chocolate.

The conching step, as carried out up to now, provides for the refined chocolate paste to be worked mechanically in longitudinal or annular metal conches. This step is conventionally carried out on successive large batches, each of a large mass of refined chocolate paste, which are mixed and remixed slowly and continuously (one after another) for about 24–48 hours or more at temperatures of between 40° and 80° C., according to the type of chocolate to be produced.

Essentially, this is a discontinuous or batch production method in which a large quantity of mechanical and thermal energy, which is required to produce good chocolate, is transferred to a large mass of chocolate paste.

In this connection, the consistent and conventional teaching of the prior art is that the more slowly the energy transfer takes place, the better are the organoleptic characteristics of the final product.

However, although, on the one hand, the prior art can give good chocolate on the other hand, it always suffers from problems constituted by 1) the considerable time taken and 2) discontinuous working, which are characteristic of the procedure (conching) which has been followed up to now to transfer the necessary energy to the chocolate paste.

Other recognized problems are connected with the fact that processing is carried out on large masses of chocolate paste which render the entire operation difficult to control, which do not permit optimal homogenization or distribution of energy throughout the mass, and which require bulky equipment and machines which are difficult to operate or to maintain and the cleaning of which, in particular, is slow and laborious. In this connection, it is important to observe that, when it is necessary to change from the production of a certain type of chocolate to another type, the time taken for the conching is further prolonged by the time taken to eliminate all traces of the first type of chocolate from the equipment and to restart the entire plant and set it in operation again on the second type of chocolate.

SUMMARY OF THE INVENTION

The problem upon which the present invention is based is that of providing a method of producing chocolate on an industrial scale and, more particularly, a method of transferring the necessary energy to a mass of refined chocolate paste so as to transform it into chocolate with good organoleptic characteristics, overcoming all the problems mentioned above with reference to the prior art.

The concept for the solution of this technical problem is that of transferring mechanical and possibly thermal energy continuously and within a short period of time, to a smaller mass of chocolate paste constituting a current portion of a continuous flow of chocolate paste.

On the basis of this concept, which is in sharp contrast with the teaching of the prior art, the problem is solved, according to the invention, by a method of producing chocolate continuously on an industrial scale from a previously refined chocolate paste, characterized in that it comprises the steps of:

producing a continuous flow of the chocolate paste and arranging it in a thin, dynamic layer and, subjecting the chocolate paste of the thin, dynamic layer to intense mechanical mixing whilst it flows in a heat-exchange relationship with a wall which is kept at a predetermined temperature.

To advantage, and in accordance with another characteristic of the invention, the method is carried out with the use of equipment comprising a cylindrical, tubular body, with a jacket for heating or cooling the internal wall thereof, inlet and outlet openings for the chocolate paste to be processed and for the processed chocolate paste, respectively, and a bladed rotor supported for rotation in the cylindrical body and having a set of blades disposed in a helical arrangement with the blades oriented for advancing the chocolate paste from the inlet opening towards the outlet opening.

Equipment of this type will be identified in the following description and in the subsequent claims by the term TURBOMIXER.

With the use of this equipment, the method of the invention for the continuous production of chocolate from a previously refined chocolate paste is characterized in that it comprises the steps of:

supplying a continuous flow of the chocolate paste into the turbomixer in which the internal wall is kept at 20° –60° C. and in which the bladed rotor is rotated at 250–1800 revolutions/minute, centrifuging the chocolate paste with the formation, from its admission to the turbomixer onwards, of a thin, dynamic, tubular layer which is advanced by the blades of the rotor towards the outlet opening of the turbomixer, in a heat-exchange relationship with the heated or cooled wall thereof, and simultaneously working the chocolate paste of the thin, dynamic, tubular layer mechanically, by means of the bladed rotor.

According to another characteristic of the invention, the turbomixer operates in sub-atmospheric pressure conditions.

In accordance with a further characteristic of the invention, a flow of hot air may be supplied to the turbomixer simultaneously with the flow of chocolate paste.

To advantage, the hot-air flow is supplied in the same direction of flow as the flow of chocolate paste.

The advantages and characteristics of the invention will become clearer from the following description of an embodiment of a method of producing chocolate continuously and on an industrial scale given below with reference to the appended drawing which is provided by way of non-limiting example and in which equipment for implementing the method is shown schematically.

BRIEF DESCRIPTION OF THE DRAWING

The drawing represents schematically the equipment used for implementing the method of the invention consisting essentially in a turbomixer and a separating device.

DETAILED DESCRIPTION OF THE INVENTION

With reference to the drawing, equipment used for implementing the method of the invention comprises, essentially, a turbomixer which in turn comprises a cylindrical, tubular body 1 arranged with its axis horizontal and closed at its opposite ends by end plates 2, 3, and having a coaxial heating or cooling jacket 4 through which, for example, diathermic oil or another fluid is intended to flow to keep the internal wall of the body 1 at a predetermined temperature.

The tubular body 1 has an inlet opening 5 for the chocolate paste to be processed and an outlet opening 6 for the processed chocolate paste. The outlet opening 6 communicates, by means of a duct 7, with a device 8 for separating air and steam from the processed product.

A bladed rotor 9 is supported for rotation in the tubular body 1, its blades 10 being arranged as a helix and oriented for centrifuging the chocolate paste being processed and simultaneously transporting it towards the outlet opening 6.

A motor 13 is provided for driving the rotor 9 at a speed of between 250 and 1800 revolutions/minute.

A turbomixer produced by the applicant has been found particularly reliable for ensuring good operation and consistent production.

According to the method of the invention, a flow of chocolate paste, previously refined by conventional methods, is supplied continuously to the turbomixer 1 through the inlet opening 5 and, from this inlet onwards, is taken and worked mechanically by the blades 10 of the rotor 9 which is kept rotating at a suitable speed.

In particular, the blades 10 of the rotor 9 centrifuge the chocolate paste against the internal wall 1a of the turbomixer 1, forming a thin, tubular layer 11 of chocolate paste from its admission to the turbomixer onwards. The thin, tubular layer 11 is dynamic since it is urged by the blades 10 of the rotor 9 towards the outlet opening 6.

Whilst the thin and dynamic, tubular layer 11 flows in contact with the wall 1a of the turbomixer in a heat-exchange relationship therewith, the chocolate paste of which it is constituted is continuously worked mechanically by the blades 10 of the rotor 9 which keep the paste in a continuous state of forced and homogeneous mixing.

In these operative conditions, a large amount of mechanical and possibly thermal energy is transferred rapidly and continuously to a small mass (a thin tubular layer) of chocolate paste.

A complete and rapid removal of moisture, any incorporated air and unwanted volatile components from the small mass of chocolate paste is consequently ensured.

In fact, it has been found that, for optimal chocolate production from an organoleptic point of view, the time spent by the chocolate paste in the turbomixer was between 3 and 10 minutes.

A hot-air flow may advantageously be supplied to the turbomixer simultaneously with the flow of chocolate paste, preferably with the same direction of flow and through the same inlet opening 5.

In order to favour the elimination of unwanted volatile substances, the turbomixer may operate in sub-atmospheric pressure conditions.

It is confirmed that the temperature of the wall 1a, and of any hot air, the speed of rotation of the bladed rotor and any vacuum conditions are selected in a manner such that moisture, any incorporated air and unwanted volatile substances are eliminated from the chocolate paste with a short time (3–10 minutes) spent in the turbomixer, producing a final product having the desired rheological and organoleptic characteristics.

Thus, for example, if a chocolate paste of very fine, substantially powdery particle size is supplied to the turbomixer, a wall temperature of between 0° and 60° C., a speed of rotation of the bladed rotor 9 within the range from 1400–1800 revolutions/minute, a hot-air temperature of between 60° and 80° C., and flow-rates of between 1 and 2 $m^3$/second are particularly advantageous. The product output from the turbomixer has a viscosity of about 8000 centipoise.

Naturally, for contingent technical and technological reasons, the turbomixer may have one or more inlet openings 5 and one or more heating or cooling jackets 4 in order, for example, to achieve a temperature gradient along the turbomixer and thus to achieve a suitable exchange of heat for certain working requirements.

When it leaves the turbomixer, the processed chocolate paste has, on average, a temperature of about 70°–75° C. and is sent to the separator of air, steam and unwanted volatile aromatic substances.

EXAMPLE 1

With the use of the equipment described schematically above and following the method of the invention, a chocolate paste, prepared by conventional refining methods and constituted by 60% of cocoa and 40% of sugar, was supplied continuously to the turbomixer 1 which was kept under a slight vacuum, with a flow-rate of 70 kg per hour.

The wall temperature was regulated to a value of about 20° C. and the speed of rotation of the bladed rotor was kept constantly at 1400 revolutions/minute.

After spending a period of about 7 minutes in the turbomixer, the original chocolate paste was transformed into a product having a viscosity of about 10 000 cps, suitable for the subsequent addition of cocoa butter and lecithin or tempering.

EXAMPLE 2

With the use of the equipment described above, a mixture of 85 parts by weight of milk chocolate paste, 14.7 parts by weight of cocoa butter and 0.3 parts by weight of lecithin was supplied continuously to the turbomixer 1 simultaneously with a hot-air flow, operating at atmospheric pressure.

The wall temperature was regulated to a value of about 40° C., the speed of rotation of the bladed rotor was kept constantly at 1400 revolutions/minute.

After spending about 5 minutes in the turbomixer, the original chocolate paste was transformed into a product having a viscosity of about 3000 cps, suitable for the subsequent tempering step.

EXAMPLE 3

With the use of the equipment described above and the same experimental conditions as Example 2 for the wall temperature, the pressure and the speed of rotation of the bladed rotor, a mixture of 78 parts by weight of milk chocolate paste, 21.7 parts by weight of cocoa butter, and 0.3 parts by weight of lecithin was supplied continuously to the turbomixer 1.

After spending about 6 minutes in the turbomixer, the original chocolate paste was transformed into a product having a viscosity of about 2500 cps, suitable for the subsequent tempering step.

We claim:

1. A method of producing chocolate continuously on an industrial scale from a previously refined chocolate paste, characterized in that it comprises the steps of:

producing a continuous flow of the chocolate paste, and arranging it in a thin, dynamic layer, and subjecting the chocolate paste of the thin, dynamic layer to intense mechanical mixing whilst it flows in a heat-exchange relationship with a wall which is kept at a predetermined temperature.

2. A method of producing chocolate continuously on an industrial scale from a previously refined chocolate paste, characterized in that it comprises the steps of:

supplying a continuous flow of the chocolate paste into a turbomixer comprising a cylindrical, tubular body provided with a jacket for heating or cooling the internal wall thereof to a temperature between 20° and 80° C., inlet and outlet openings for the chocolate paste to be processed and for the processed chocolate paste, respectively, and a bladed rotor supported for rotation in the cylindrical body and having a set of blades arranged as a helix with the blades oriented for advancing the chocolate paste from the inlet opening towards the outlet opening, centrifuging the chocolate paste with the formation, from its admission to the turbomixer onwards, of a thin, dynamic, tubular layer which is advanced towards the outlet opening of the turbomixer in a heat-exchange relationship with the wall thereof, and simultaneously working the chocolate paste of the thin, dynamic, tubular layer mechanically, by means of the bladed rotor.

3. A method according to claim 2, characterized in that the turbomixer operates in sub-atmospheric pressure conditions.

4. A method according to claim 2, characterized in that the turbomixer is supplied continuously with a hot-air flow.

5. A method according to claim 2, characterized in that respective flows of other conventional components of the chocolate are supplied to the turbomixer simultaneously with the flow of chocolate paste.

* * * * *